(12) United States Patent
Shah et al.

(10) Patent No.: US 8,295,278 B2
(45) Date of Patent: Oct. 23, 2012

(54) SYSTEMS AND METHODS FOR PSEUDOWIRE-IN-PSEUDOWIRE TO TRANSPORT PSEUDOWIRE PAYLOAD ACROSS PACKET SWITCHED NETWORKS

(75) Inventors: Himanshu Shah, Hopkinton, MA (US); Mark Libby, Groton, MA (US); David Parks, Chelmsford, MA (US)

(73) Assignee: Ciena Corporation, Hanover, MD (US)

( * ) Notice: Subject to any disclaimer, the term of this patent is extended or adjusted under 35 U.S.C. 154(b) by 490 days.

(21) Appl. No.: 11/958,656

(22) Filed: Dec. 18, 2007

(65) Prior Publication Data

US 2009/0154453 A1 Jun. 18, 2009

(51) Int. Cl.
*H04L 12/28* (2006.01)
(52) U.S. Cl. ...................... 370/389; 370/409; 370/395.5; 370/392
(58) Field of Classification Search ............... 370/395.5, 370/248, 401, 218, 389, 409, 392
See application file for complete search history.

(56) References Cited

U.S. PATENT DOCUMENTS

| | | | | |
|---|---|---|---|---|
| 2005/0147104 A1* | 7/2005 | Ould-Brahim | ............. | 370/395.5 |
| 2008/0084891 A1* | 4/2008 | Balus et al. | .................. | 370/409 |
| 2008/0095061 A1* | 4/2008 | Hua et al. | ....................... | 370/248 |
| 2008/0279110 A1* | 11/2008 | Hart et al. | ...................... | 370/248 |
| 2009/0086621 A1* | 4/2009 | Wan et al. | ...................... | 370/218 |
| 2009/0168783 A1* | 7/2009 | Mohan et al. | ............... | 370/395.5 |
| 2009/0185573 A1* | 7/2009 | Guichard et al. | ............. | 370/401 |
| 2010/0040206 A1* | 2/2010 | DelRegno et al. | ........... | 379/32.01 |
| 2011/0090909 A1* | 4/2011 | Krzanowski | .................. | 370/392 |

OTHER PUBLICATIONS

Lobo et al., LMPLS configuration on Cisco IOS Software, Chapter 11, Introductin to Layer 2 VPNs, Aug. 17, 2007.*

* cited by examiner

*Primary Examiner* — Man Phan
*Assistant Examiner* — Mandish Randhawa
(74) *Attorney, Agent, or Firm* — Clements Bernard PLLC; Christopher L. Bernard; Lawrence A. Baratta, Jr.

(57) ABSTRACT

The present invention provides systems and methods which create an infrastructure/transport Pseudowire (PW) a priori between two Provider Edge (PE) devices. Accordingly, other PWs can be mapped to this transport PW. In an exemplary application, the transport PW (which is a MS-PW by itself) can start and end between two Switching Provider Edge (S-PE) devices and span across multiple S-PEs in between. In another exemplary application, the transport PW terminates between two Terminating Provider Edge (T-PE) devices spanning across all S-PEs in between. In a further exemplary application, the transport PW can start at a S-PE or T-PE and terminate at a T-PE or S-PE, respectively. The placement of the endpoints of the transport PW (on two PEs) determines the number of intervening S-PEs that benefit from this application.

19 Claims, 5 Drawing Sheets

SYSTEMS AND METHODS FOR PSEUDOWIRE-IN-PSEUDOWIRE TO TRANSPORT PSEUDOWIRE PAYLOAD ACROSS PACKET SWITCHED NETWORKS

FIELD OF THE INVENTION

The present invention relates generally to communication networks. More particularly, the present invention provides systems and methods which create an infrastructure/transport Pseudowire (PW) a priori between two Provider Edge (PE) devices to eliminate the need to participate in client multi-segment PW setup.

BACKGROUND OF THE INVENTION

A pseudowire (PW) is an emulation of a native service over a Packet Switched Network (PSN). The native service can be asynchronous transfer mode (ATM), Frame Relay, Ethernet, low-rate time-division multiplex (TDM), SONET/SDH, or the like, while the PSN can be multi-protocol label switched (MPLS), Internet Protocol (IP) network (i.e., either IPv4 or IPv6), Layer 2 Tunneling Protocol Version 3 (L2TPv3), or the like. The PW emulates the operation of a "transparent wire" carrying the native service. There are now many PW standards, the most important of which are IETF RFCs 3985 (PWE3 architecture), 4447 (PW setup using LDP), 4448 (Ethernet PW), and 4553 (Structure-Agnostic TDM over Packet (SAToP) TDM PW), as well as ITU-T Y.1411 through Y.1415, Y.1452 and Y.1453 (ATM, TDM, voice services, and Ethernet PWs), and X.84 (Frame Relay PW).

PW technology is used conventionally to carry a customer's layer two traffic over a service provider's (SP) packet switched network (PSN). Advantageously, PW technology has allowed SP's to migrate traditional layer one and layer two services to a converged PSN. However, no single SP has a network that is ubiquitous or spans the entire globe. In order to connect a client that has geographically-diverse sites spread across the world, the SP has to create a PW that transits over other SP's networks, and may even have to terminate on other SP's networks. This reality has created the need for multi-segment PW (MS-PW) where single-segment PWs (SS-PW) are stitched together at each network boundary to form an end-to-end multi-segment PW that transits through two or more SP's PSNs.

The MS-PW requires a switching provider edge (S-PE) to engage in PW setup mechanisms that are specific to the type of PW that is being stitched end-to-end. A provider edge (PE) is a device that provides PW emulation edge-to-edge (PWE3) to a customer edge (CE). A CE is a device where one end of a service originates and/or terminates. The CE is not aware that is using an emulated service rather than a native service. The MS-PW requires coordination and configuration of all stitched PWs at each S-PE that is present in the PW path. Disadvantageously, such configurations are unwieldy. In addition, each S-PE is cognizant of every MS-PW that is passing through it and hence has to maintain control structure and state for each leading to scalability issues.

BRIEF SUMMARY OF THE INVENTION

In various exemplary embodiments, the present invention provides systems and methods which create an infrastructure/transport Pseudowire (PW) a priori between two Provider Edge (PE) devices. Accordingly, other PWs can be mapped to this transport PW. In an exemplary application, the transport PW (which is a MS-PW by itself) can start and end between two Switching Provider Edge (S-PE) devices and span across multiple S-PEs in between. In another exemplary application, the transport PW terminates between two Terminating Provider Edge (T-PE) devices spanning across all S-PEs in between. In a further exemplary application, the transport PW can start at a S-PE or T-PE and terminate at a T-PE or S-PE, respectively. The placement of the endpoints of the transport PW (on two PEs) determines the number of intervening S-PEs that benefit from this application.

In an exemplary embodiment of the present invention a method for pseudowire-in-pseudowire to transport a pseudowire payload across packet switched networks configuring a transport pseudowire from a first provider edge to a second provider edge; mapping one or more client pseudowires to the transport pseudowire at the first provider edge; transporting the one or more client pseudowires over the transport pseudowire; and de-mapping the one or more client pseudowires from the transport pseudowire at the second provider edge. The method for pseudowire-in-pseudowire further includes configuring a tunnel label switched path between the first provider edge and an intermediate provider edge and between the intermediate provider edge and the second provider edge, wherein the transport pseudowire is transported over the tunnel label switched path. Optionally, the mapping step includes decapsulating a data link header and transport tunnel-related headers; prepending a transport pseudowire header including a pseudowire label and pseudowire control word; prepending a tunnel-related header; and prepending a data link header. The transporting step further includes transmitting a control frame from the first provider edge to the second provider edge. The de-mapping step includes receiving a frame; removing the transport pseudowire header from the frame; determining if the frame is a client pseudowire of the one or more client pseudowires or the control frame; using pseudowire label semantics for further processing of the client pseudowire if the frame is the client pseudowire; and submitting the frame to a control node for processing if the frame is the control frame. The first provider edge and the second provider edge include one of a terminating provider edge and a switching provider edge. The transport pseudowire includes a multi-segment pseudowire. Optionally, the method for pseudowire-in-pseudowire further includes configuring a dedicated management pseudowire for establishing a label distribution protocol session between the first provider edge and the second provider edge for the purpose of distributing client PW labels. Alternatively, the mapping step includes prepending a frame with stacked multi-protocol label switching labels including bottom labels for the transport pseudowire followed by client pseudowire labels; and the de-mapping step include reading the transport pseudowire label and one of submitting to a control plane for local processing and submitting for forward processing responsive to the transport pseudowire label.

In another exemplary embodiment of the present invention, a pseudowire-in-pseudowire system configured to transport a pseudowire payload across packet switched networks includes a first provider edge; a second provider edge interconnected to the first provider edge through a multi-protocol label switched network; a transport pseudowire configured between the first provider edge and the second provider edge over a tunnel label switched path; and one or more client pseudowires transported from the first provider edge to the second provider edge, wherein the one or more client pseudowires are transported over the transport pseudowire. Optionally, the first provider edge and the second provider edge includes a switching provider edge; wherein the multi-protocol label switched network includes one or more intermediate switching provider edges; and the transport pseudowire is configured between the first provider edge and the second provider edge through the one or more intermediate switching provider edges. Alternatively, the first provider edge and the second provider edge include a terminating provider edge; wherein the multi-protocol label switched network includes one or more intermediate switching provider edges; and the transport pseudowire is configured between the first provider edge and the second provider edge through the one or more intermediate switching provider edges. The first provider edge is configured to map the one or more client pseudowires to the transport pseudowire; and the second provider edge is configured to de-map the one or more client pseudowires from the transport pseudowire. Optionally, the first provider edge is configured to send control frames over the transport pseudowire to the second provider edge. Alternatively, the pseudowire-in-pseudowire system further includes a dedicated management pseudowire for establishing a label distribution protocol session between the first provider edge and the second provider edge.

In yet another exemplary embodiment of the present invention, a pseudowire-in-pseudowire network configured to transport a pseudowire payload across packet switched networks includes a plurality of terminating provider edges, wherein each of the plurality of terminating provider edges is connected to one of a plurality of multi-label protocol switched networks; a plurality of switching provider edges interconnecting the plurality of multi-label protocol switched networks; and one or more transport pseudowires including a layer two Internet Protocol transport pseudowire transported over a tunnel label switched path, wherein each of the one or more transport pseudowires is provisioned between one of: a first terminating provider edge of the plurality of terminating provider edges and a second terminating provider edge of the plurality of terminating provider edges; and a first switching provider edge of the plurality of switching provider edges and a second switching provider edge of the plurality of switching provider edges. The one or more transport pseudowires include a multi-segment pseudowire; and each of the one or more transport pseudowires is configured to transport one or more client pseudowires. Each of the plurality of terminating provider edges and the plurality of switching provider edges are configured to map the one or more client pseudowires to one of the one or more transport pseudowires; and each of the plurality of terminating provider edges and the plurality of switching provider edges are configured to de-map the one or more client pseudowires from the one of the one or more transport pseudowires. Optionally, the one or more client pseudowires include one of an asynchronous transfer mode pseudowire, an Ethernet pseudowire, a time division multiplexed pseudowire, and combinations thereof. Alternatively, endpoints of each of the one or more transport pseudowires are configured to send control frames over each of the one or more transport pseudowires. The pseudowire-in-pseudowire network can further include one or more dedicated management pseudowires for each of the one or more transport pseudowires, wherein the one or more dedicated management pseudowires are for establishing a label distribution protocol session between endpoints of each of the one or more transport pseudowires.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods which create an infrastructure/transport Pseudowire (PW) a priori between two Provider Edge (PE) devices. Accordingly, other PWs can be mapped to this transport PW. In an exemplary application, the transport PW (which is a MS-PW by itself) can start and end between two Switching Provider Edge (S-PE) devices and span across multiple S-PEs in between. In another exemplary application, the transport PW terminates between two Terminating Provider Edge (T-PE) devices spanning across all S-PEs in between. In a further exemplary application, the transport PW can start at a S-PE or T-PE and terminate at a T-PE or S-PE, respectively. The placement of the endpoints of the transport PW (on two PEs) determines the number of intervening S-PEs that benefit from this application.

Advantageously, the present invention provides a scalable solution for S-PEs by eliminating the need to participate in client MS-PW setup. This transparency enables a faster time to market for service providers deploying PW-based services. Also, it simplifies the client MS-PW setup configuration providing both the client and the SP significant ease of operations. The present invention expedites the dynamic setup of client MS-PW when infrastructure/transport PW are pre-built. This is especially important as PWs become more and more widely deployed by SPs throughout the world. Also, this reduces the number of PWs within the portions of the network where an infrastructure/transport PW spans. This significantly increases a SPs ability to scale their MPLS network using PWs, it removes complexity of too many PWs, and it makes much more efficient use of their costly edge and core IP router resources.

Figure 1:
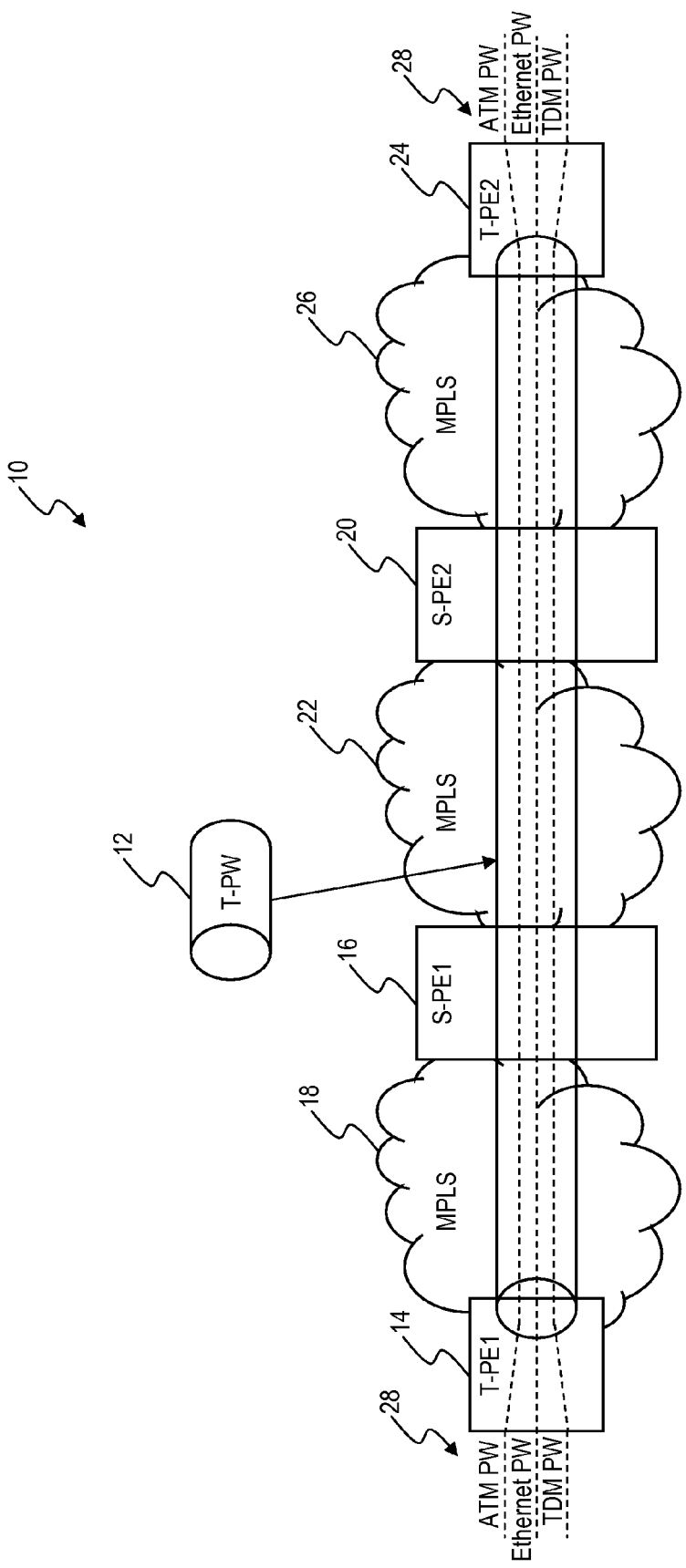
FIG. 1 is a network illustrating a PW-in-PW configuration with a transport PW (T-PW) according to an exemplary embodiment of the present invention.

Referring to FIG. 1, a network 10 is depicting illustrating a PW-in-PW configuration with a transport PW (T-PW) 12 according to an exemplary embodiment of the present invention. The network 10 includes a T-PE 14 connected to a first S-PE 16 through a first MPLS network 18, and a second S-PE 20 connected to the first S-PE 16 through a second MPLS network 22. The second S-PE 20 is connected to a second T-PE 24 through a third MPLS network 26. The T-PEs 14,24 and S-PEs 16,20 can include switches, routers, and the like. The MPLS networks 18,22,26 can include multiple nodes, such as switches, routers, and the like.

The T-PW 12 is a pre-provisioned, i.e. a priori, PW connection between the first T-PE 14 and the second T-PE 24. A Tunnel Label Switched Path (LSP) (not shown) is configured between the T-PE 14 and S-PE 16, the S-PE 16 and S-PE 20, and the S-PE 20 and T-PE 24. The T-PW 12 is transported over this Tunnel LSP. The Tunnel LSP is path through the MPLS networks 18,22,26, and is set up by a signaling protocol, such as Label Distribution Protocol (LDP), Resource Reservation Protocol-Traffic Engineering (RSVP-TE), Constraint-based Routing Label Distribution Protocol (CR-LDP), or the like.

The T-PW 12 is utilized as an input/output logical port at the T-PEs 14,24 to send control frames over the PW that is directed to the T-PE 14,24 at the other end. This conduit can be used for T-PEs 14,24 to setup targeted LDP sessions with the remote T-PE 14,24. The LDP session between the two T-PEs 14,24 over the T-PW 12 is then used to setup client MS-PWs 28. This mechanism provides all the T-PEs 14,24 and S-PEs 16,20 present in the T-PW 12 path a transparency to the setup procedures for client PWs.

The network 10 illustrates the T-PW 12 starting and ending at the T-PEs 14,24. Alternatively, the T-PW 12 can be configured to start and end at either of the S-PEs 16,20. Those of ordinary skill in the art will recognize all the mechanisms described herein can apply to T-PWs between S-PEs 16,20, T-PEs 14,24, and the like. Also, the T-PW 12 can be setup according to existing PW setup protocols as are known in the art.

The mapping of the client PWs 28 over the T-PW 12 is done by the ingress PE, such as T-PE 14. For example, the client PWs 28 can include an ATM PW, an Ethernet PW, a TDM PW, and the like. The selection of a suitable T-PW 12 to carry the client PW 28 is based on the target of the client PW 28, quality of service (QOS) criteria, and other user defined factors. Such mapping criteria can be either configured by the user or determined based on the incoming setup requests for the client PW 28. The present invention contemplates one or more T-PW 12 connections in the network 10 based on different factors, such as different targets (e.g., T-PEs 14,24, S-PEs 16,20), QOS, and the like. For example, different T-PW 12 connections can be set up between the T-PEs 14,24 for different classes of QOS. Also, different T-PW 12 connections can be setup between different nodes, e.g. a T-PW between S-PE 16 and S-PE 20, etc.

The T-PW 12 provides greater scalability across a core, i.e. MPLS networks 18,22,26. There are fewer PW across the core, such as when using a mesh of T-PWs between all S-PEs 16,20. Also, the T-PW 12 protects the S-PEs 16,20 from the inner-working setup of different client PW types 28 (i.e., ATM, Ethernet, TDM, etc.). There are fewer PW segments in the network 10, i.e. one T-PW 12 between the T-PE 14 and the T-PE 24 rather than three. Further, the T-PW 12 can include a static configuration which eliminates the need for dynamic signal processing of individual client PWs 28 at the S-PEs 16,20, i.e. far less complex and resource intensive.

Figure 2:
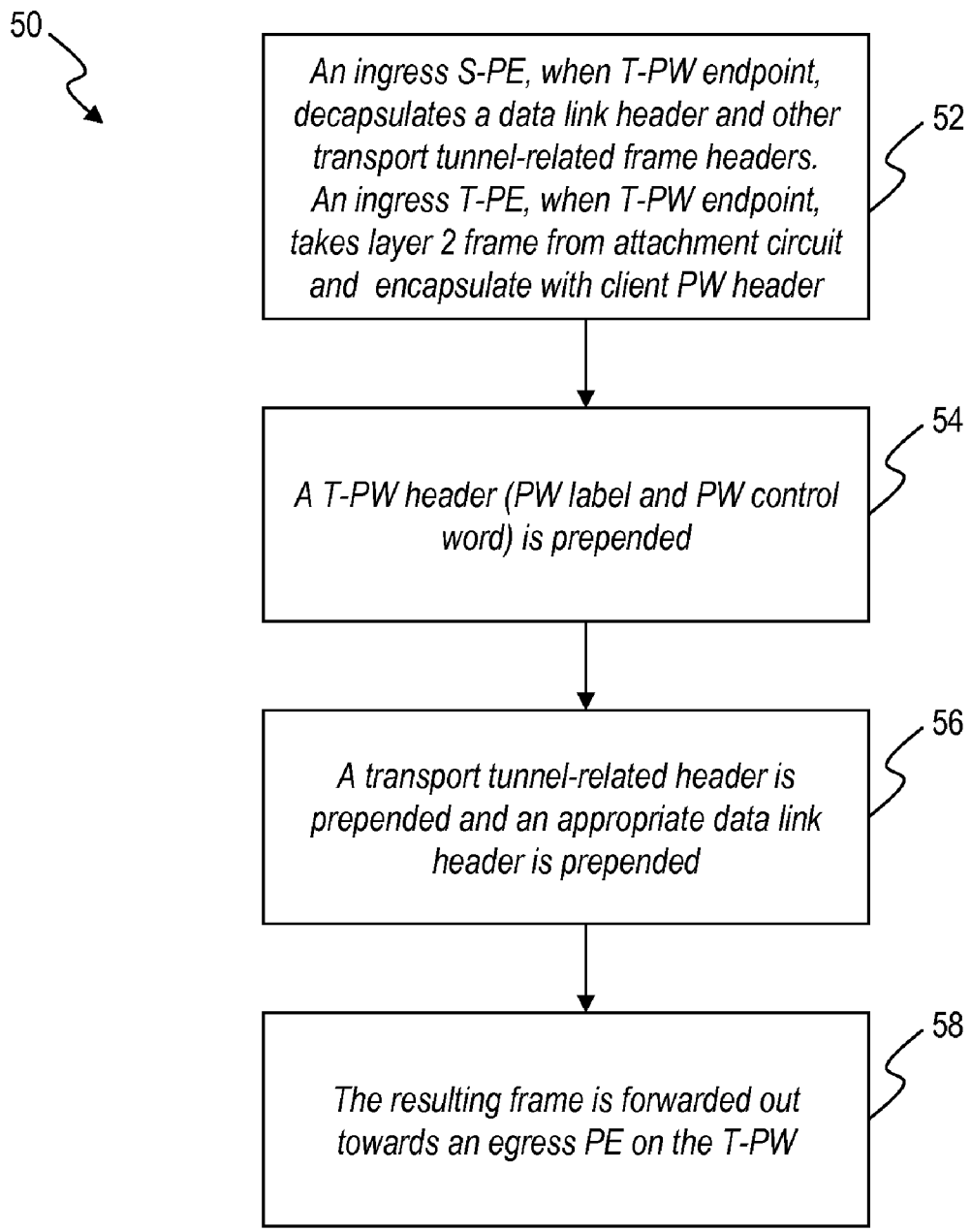
FIG. 2 is a flowchart illustrating frame manipulation of a client PW at an ingress S-PE and client data at ingress T-PE endpoint for PW-in-PW according to an exemplary embodiment of the present invention.

Referring to FIG. 2, a flowchart illustrates frame manipulation 50 of a client PW at an ingress S-PE and client data at ingress T-PE endpoint for PW-in-PW according to an exemplary embodiment of the present invention. The client PW can include any type of PW, such as an ATM PW, an Ethernet PW, a TDM PW, and the like. The ingress PE can include a T-PE or S-PE, and a T-PW is configured between the ingress PE and an egress PE. For an ingress T-PE, the egress PE is a T-PE, and for an ingress S-PE, the egress is a S-PE.

The frame manipulation 50 at the ingress PE first decapsulates a data link header and other transport tunnel-related frame headers (step 52). As a result, the client PW packet contains PW header (i.e., a PW label and PW control word, if present) and the PW payload data. Next, a T-PW header (i.e., PW label and PW control word) is prepended to the client PW packet (step 54). A transport tunnel related header is prepended and an appropriate data link header is prepended (step 56). After steps 52,54,56, the resulting frame is forwarded out towards the egress PE on the T-PW (step 58). Note that the resulting frame of the frame manipulation 50 is a PW-in-PW frame which includes two PW headers followed by the payload. This compares to stacked MPLS labels where two MPLS shim labels are followed by the client PW label. Note that when T-PW endpoint is ingress T-PE, client PW header related processing is done based on the type of client PW before encapsulating the frame with T-PW header.

Figure 3:
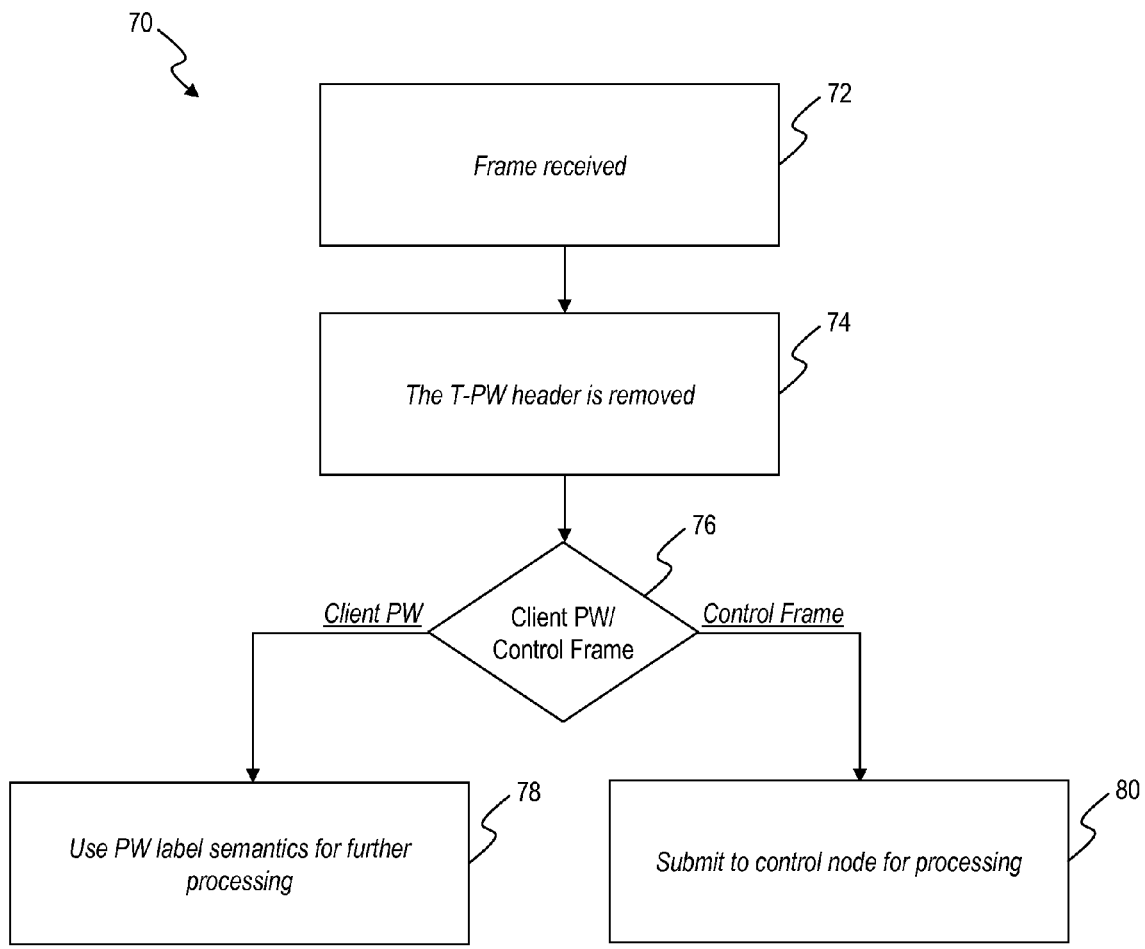
FIG. 3 is a flowchart illustrating frame manipulation of a client PW at an egress PE for PW-in-PW according to an exemplary embodiment of the present invention.

Referring to FIG. 3, a flowchart illustrates frame manipulation 70 of a client PW at an egress PE for PW-in-PW according to an exemplary embodiment of the present invention. The frame manipulation 70 at the egress PE receives a frame (step 72). The egress PE removes the T-PW header (step 74). The T-PW header indicates whether the remaining frame includes client PW payload or a control frame for the PE itself, and this determination is made after removing the T-PW header (step 76). If the PW payload is a client PW, then the PW label contains the semantics for further processing, such as swap or pop of PW label, and these semantics are used for further processing of the client PW (step 78). If the PW payload contains control frame for the PE itself, then the frame is submitted to control node for processing (step 80).

The mechanisms described herein in FIGS. 2 and 3 for the T-PW utilize a type "Layer 2 IP transport PW with control word" for the T-PW. The control word is a four-octet header used to carry per-packet information when the PSN is MPLS. The control word is used to carry most of the information needed by the PWE3 Encapsulation Layer and the PSN Convergence Layer in a compact format. The flags in the control word provide the necessary payload convergence. A sequence field provides support for both in-order payload delivery and a PSN fragmentation service within the PSN Convergence Layer (supported by a fragmentation control method).

Figure 4:
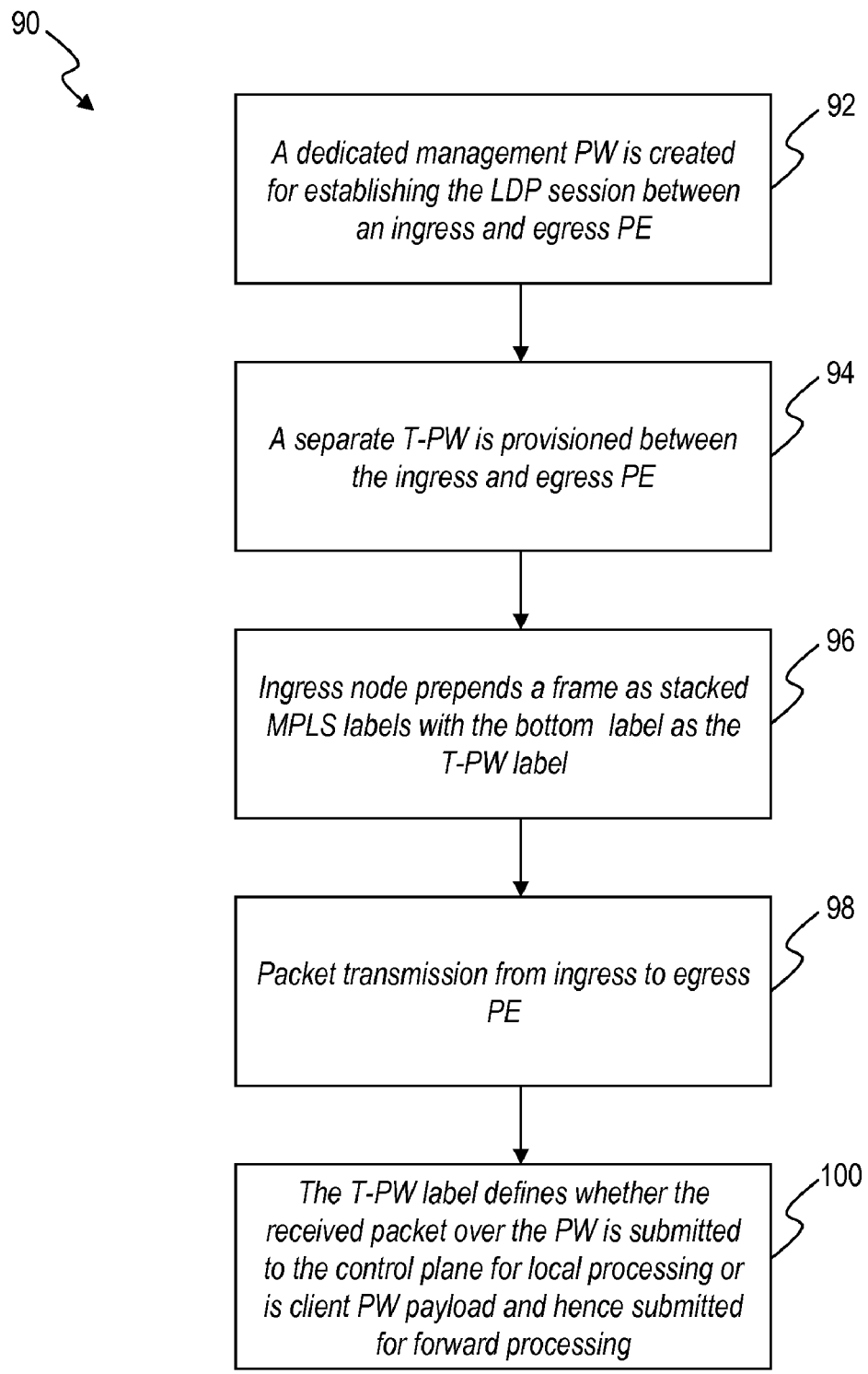
FIG. 4 is a flowchart illustrating an alternative frame encapsulation which uses a Layer 2 IP transport PW without control word that can be used according to an exemplary embodiment of the present invention.

Referring to FIG. 4, as an alternative frame encapsulation 90, instead of using Layer 2 IP transport PW with control word, Layer 2 IP transport PW without control words can be used. For this alternative frame encapsulation 90, a dedicated management PW is created for establishing the LDP session between an ingress and egress PE (step 92). This PW is in turn used only to signal client PW between the ingress and egress node. A separate T-PW is provisioned to carry client PWs between the ingress and egress PE (step 94). At the ingress node, the PW labels are prepended to a frame as stacked MPLS labels with the bottom two labels as the T-PW label followed by client PW labels (with no intervening control word) (Step 96). The packet is transmitted from the ingress to egress node over the T-PW with the stacked MPLS labels (step 98). At the egress node, the T-PW label is read first, and the T-PW label defines whether the received packet over the PW is submitted to the control plane for local processing or is client PW payload and hence submitted for forward processing (step 100).

Figure 5:
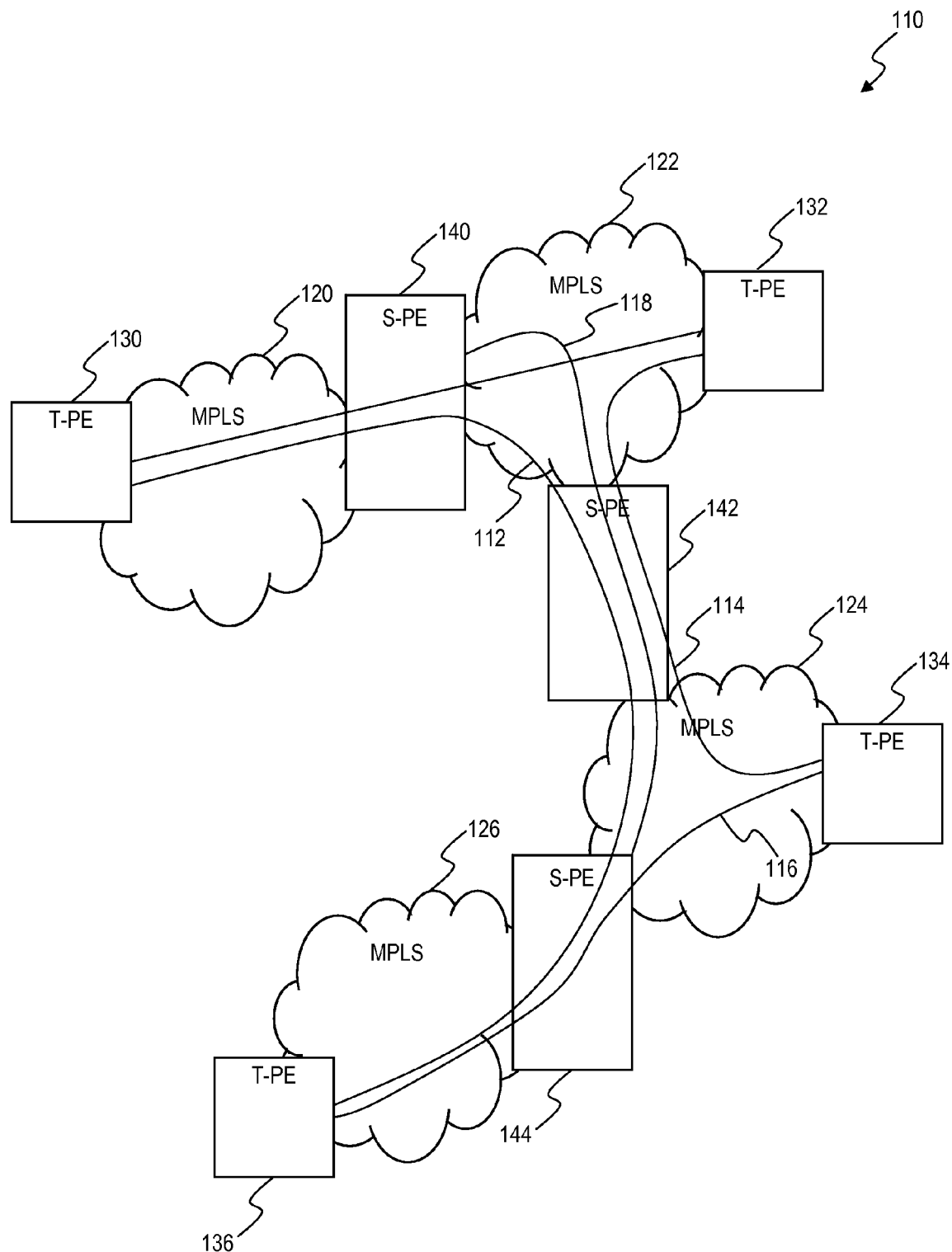
FIG. 5 is a network illustrating multiple T-PWs through various different MPLS networks according to an exemplary embodiment of the present invention.

Referring to FIG. 5, a network 110 is illustrated utilizing multiple T-PWs 112,114,116,118 through various different MPLS networks 120,122,124,126 according to an exemplary embodiment of the present invention. The MPLS networks 120,122,124,126 can include different service provider networks, and can even be separated in geographically-diverse locations, e.g. different continents. The T-PWs 112,114,116, 118 enable network operators to pre-provision stitched MS-PW connections up front, avoiding the requirements for adding stitched MS-PW connections for each client PW.

The network 110 can include multiple T-PEs 130,132,134, 136 and multiple S-PEs 140,142,144 between each MPLS network 120,122,124,126. For example, the T-PE 130 can be connect to the MPLS 120, the MPLS 120 and MPLS 122 can be connected through the S-PE 140, and the T-PE 132 can be connected to the MPLS 122. Further, the MPLS 122 and the MPLS 124 can be connected through the S-PE 142, the T-PE 132 can be connected to the MPLS 124, the MPLS 124 and MPLS 126 can be connected through the S-PE 144, and the T-PE 136 can be connected to the MPLS 126.

As described herein, T-PW connections can be between S-PEs and between T-PEs. For example, the network 110 includes the T-PW 112 between T-PEs 130,136 spanning through all the MPLSs 120,122,124,126 via the S-PEs 140, 142,144. For the T-PW 112, there is a tunnel LSP between T-PE 130 and S-PE 140, between S-PE 140 and S-PE 142, between S-PE 142 and S-PE 144, and between S-PE 144 and T-PE 136. The T-PW 112 is transported over this tunnel LSP, and is capable of carrying multiple client PWs.

The network 110 also includes the T-PW 114 between the T-PE 132 and T-PE 134. The T-PW 114 is transported over a tunnel LSP from the T-PE 132 to the S-PE 142, and from the S-PE 142 to the T-PE 134. The T-PW 116 is configured between the T-PE 134 and the T-PE 136 over a tunnel LSP from the T-PE 134 to the S-PE 144 and from the S-PE 144 to the T-PE 136. Also, the network 110 illustrates the T-PW 118 between the S-PE 140 and the S-PE 144. The T-PE 118 is transported over a tunnel LSP from the S-PE 140 to the S-PE 142 and from the S-PE 142 to the S-PE 144.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for pseudowire-in-pseudowire to transport a pseudowire payload across packet switched networks, comprising:
    configuring a transport pseudowire from a first provider edge to a second provider edge;
    configuring a tunnel label switched path between the first provider edge and an intermediate provider edge and between the intermediate provider edge and the second provider edge;
    mapping one or more client pseudowires to the transport pseudowire at the first provider edge, wherein the mapping step comprises decapsulating a data link header and transport tunnel-related headers, prepending a transport pseudowire header comprising a pseudowire label and pseudowire control word; prepending a tunnel-related header; and prepending a data link header;
    transporting the one or more client pseudowires over the transport pseudowire, wherein the transport pseudowire is transported over the tunnel label switched path and is a separate connection therefrom, and wherein transporting the transport pseudowire comprises transmitting a control frame from the first provider edge to the second provider edge; and
    de-mapping the one or more client pseudowires from the transport pseudowire at the second provider edge, wherein the de-mapping step comprises receiving a frame, removing the transport pseudowire header from the frame, determining if the frame comprises a client pseudowire of the one or more client pseudowires or the control frame, using pseudowire label semantics for further processing of the client pseudowire if the frame comprises the client pseudowire, and submitting the frame to a control node for processing if the frame comprises the control frame.

2. The method for pseudowire-in-pseudowire of claim 1, wherein the first provider edge and the second provider edge comprise one of a terminating provider edge and a switching provider edge.

3. The method for pseudowire-in-pseudowire of claim 1, wherein the transport pseudowire comprises a multi-segment pseudowire.

4. The method for pseudowire-in-pseudowire of claim 3, further comprising:
    transporting the one or more client pseudowires over one segment comprising the multi-segment pseudowire in lieu of transporting the one or more client pseudowires over multiple segments.

5. The method for pseudowire-in-pseudowire of claim 1, further comprising:
    configuring the transport pseudowire in a static configuration thereby eliminating a need for dynamic signal processing of the one or more client pseudowires at the first provider edge and the second provider edge.

6. The method for pseudowire-in-pseudowire of claim 1, further comprising:
    transporting a client pseudowire of the one or more client pseudowires over the transport pseudowire, wherein the client pseudowire does not participate in a setup of the transport pseudowire.

7. A pseudowire-in-pseudowire system configured to transport a pseudowire payload across packet switched networks, comprising:
    a first provider edge;
    a second provider edge interconnected to the first provider edge through a multi-protocol label switched network;
    a transport pseudowire configured between the first provider edge and the second provider edge over a tunnel label switched path;
    a dedicated management pseudowire for establishing a label distribution protocol session between the first provider edge and the second provider edge, wherein the dedicated management pseudowire is operable to distribute client pseudowire labels; and
    one or more client pseudowires transported from the first provider edge to the second provider edge, wherein the one or more client pseudowires are transported over the transport pseudowire;
    wherein the first provider edge is configured to map one or more client pseudowires to the transport pseudowire, wherein to map comprises decapsulating a data link header and transport tunnel-related headers, prepending a transport pseudowire header comprising a pseudowire label and pseudowire control word; prepending a tunnel-related header; and prepending a data link header;
    wherein the one or more client pseudowires are transported over the transport pseudowire, wherein the transport pseudowire is transported over the tunnel label switched path and is a separate connection therefrom, and wherein transporting the transport pseudowire comprises transmitting a control frame from the first provider edge to the second provider edge; and
    wherein the second provider edge is configured to de-map the one or more client pseudowires from the transport pseudowire, wherein to de-map comprises receiving a frame, removing the transport pseudowire header from the frame, determining if the frame comprises a client pseudowire of the one or more client pseudowires or the control frame, using pseudowire label semantics for further processing of the client pseudowire if the frame comprises the client pseudowire, and submitting the frame to a control node for processing if the frame comprises the control frame.

8. The pseudowire-in-pseudowire system of claim 7, wherein the first provider edge and the second provider edge comprise a switching provider edge;
   wherein the multi-protocol label switched network comprises one or more intermediate switching provider edges; and
   wherein the transport pseudowire is configured between the first provider edge and the second provider edge through the one or more intermediate switching provider edges.

9. The pseudowire-in-pseudowire system of claim 7, wherein the first provider edge and the second provider edge comprise a terminating provider edge;
   wherein the multi-protocol label switched network comprises one or more intermediate switching provider edges; and
   wherein the transport pseudowire is configured between the first provider edge and the second provider edge through the one or more intermediate switching provider edges.

10. The pseudowire-in-pseudowire system of claim 7, wherein the transport pseudowire comprises a static configuration thereby eliminating a need for dynamic signal processing of the one or more client pseudowires at the first provider edge and the second provider edge.

11. The pseudowire-in-pseudowire system of claim 7, wherein the one or more client pseudowires do not participate in a setup of the transport pseudowire.

12. The pseudowire-in-pseudowire system of claim 7, wherein the transport pseudowire comprises a multi-segment pseudowire.

13. The pseudowire-in-pseudowire system of claim 12, wherein the one or more client pseudowires are transported over one segment comprising the multi-segment pseudowire in lieu of transporting the one or more client pseudowires over multiple segments.

14. A method for pseudowire-in-pseudowire to transport a pseudowire payload across packet switched networks, comprising:
   configuring a transport pseudowire from a first provider edge to a second provider edge;
   configuring a dedicated management pseudowire for establishing a label distribution protocol session between the first provider edge and the second provider edge, wherein the dedicated management pseudowire is operable to distribute client pseudowire labels;
   mapping one or more client pseudowires to the transport pseudowire at the first provider edge, wherein the mapping step comprises prepending a frame with stacked multi-protocol label switching labels comprising bottom labels for the transport pseudowire followed by client pseudowire labels;
   transporting the one or more client pseudowires over the transport pseudowire, wherein the transport pseudowire is transported over a tunnel label switched path and is a separate connection therefrom; and
   de-mapping the one or more client pseudowires from the transport pseudowire at the second provider edge, wherein the de-mapping step comprises reading a transport pseudowire label and one of submitting to a control plane for local processing and submitting for forward processing responsive to the transport pseudowire label.

15. The method for pseudowire-in-pseudowire of claim 14, wherein the first provider edge and the second provider edge comprise one of a terminating provider edge and a switching provider edge.

16. The method for pseudowire-in-pseudowire of claim 14, wherein the transport pseudowire comprises a multi-segment pseudowire.

17. The method for pseudowire-in-pseudowire of claim 16, further comprising:
   transporting the one or more client pseudowires over one segment comprising the multi-segment pseudowire in lieu of transporting the one or more client pseudowires over multiple segments.

18. The method for pseudowire-in-pseudowire of claim 14, further comprising:
   configuring the transport pseudowire in a static configuration thereby eliminating a need for dynamic signal processing of the one or more client pseudowires at the first provider edge and the second provider edge.

19. The method for pseudowire-in-pseudowire of claim 14, further comprising:
   transporting a client pseudowire of the one or more client pseudowires over the transport pseudowire, wherein the client pseudowire does not participate in a setup of the transport pseudowire.

* * * * *